United States Patent [19]

Perez et al.

[11] 4,231,625
[45] Nov. 4, 1980

[54] TAPE STORAGE CABINET

[76] Inventors: Jose L. Perez, C-29, 10th Ave., Lincoln Gardens, Key West, Fla. 33040; Humberto A. Jimenez, 775 W. Dennis, Wheeling, Ill. 60090

[21] Appl. No.: 974,216

[22] Filed: Dec. 29, 1978

[51] Int. Cl.² ............................................. A47B 67/02
[52] U.S. Cl. .................................... 312/245; 312/242; 312/10; 312/223; 220/331
[58] Field of Search ............... 312/245, 246, 247, 242, 312/208, 211, 10, 14, DIG. 33, 223; 211/84; 206/387; 220/331; 296/37.1; 224/42.46 R

[56] References Cited

U.S. PATENT DOCUMENTS

| | | | |
|---|---|---|---|
| 1,597,092 | 8/1926 | McTighe | 220/331 |
| 2,247,020 | 6/1941 | Hilckman | 312/246 |
| 2,321,794 | 6/1943 | Braun | 312/10 |
| 2,354,872 | 8/1944 | Mitnick | 312/10 |
| 2,519,490 | 8/1950 | Miller | 312/DIG. 33 |
| 2,555,716 | 6/1951 | Todhunter | 312/246 |
| 3,028,208 | 4/1962 | Sharpe | 312/223 |
| 3,371,976 | 3/1968 | Ritz, Jr. | 312/245 |
| 3,443,851 | 5/1969 | Earl | 312/245 |
| 3,606,447 | 9/1971 | Ryding | 312/245 |
| 3,627,398 | 12/1971 | Reese | 312/246 |
| 3,710,900 | 1/1973 | Fink | 312/10 |
| 3,811,745 | 5/1974 | Cylke | 312/245 |
| 3,858,720 | 1/1975 | Flagler | 206/387 |
| 4,048,050 | 9/1977 | Hillman | 220/331 |

FOREIGN PATENT DOCUMENTS 205585 6/1939 Switzerland ............... 312/10

Primary Examiner—Victor N. Sakran
Attorney, Agent, or Firm—Hill, Van Santen, Steadman, Chiara & Simpson

[57] ABSTRACT

A tape storage cabinet which can be detachably mounted under the dash of a vehicle and which has a pair of cover members that can be opened so that tapes can be removed or stored. An insert member adapts the cabinet to cassettes and can be removed completely or partially to adapt the cabinet to cartridges.

8 Claims, 11 Drawing Figures

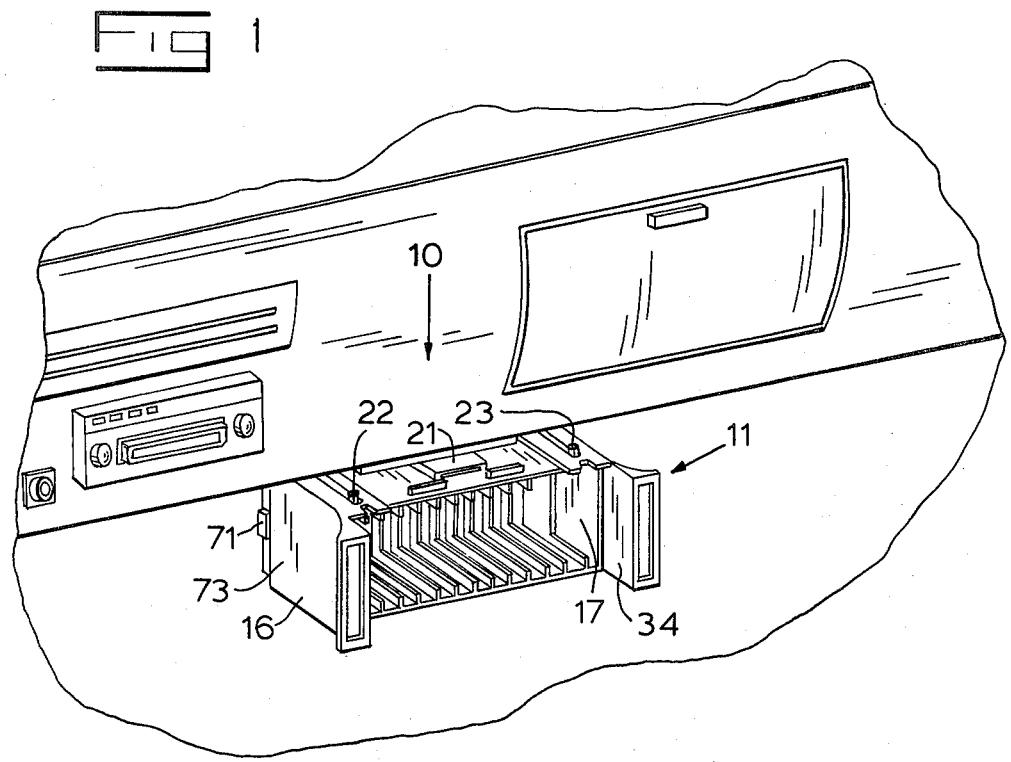
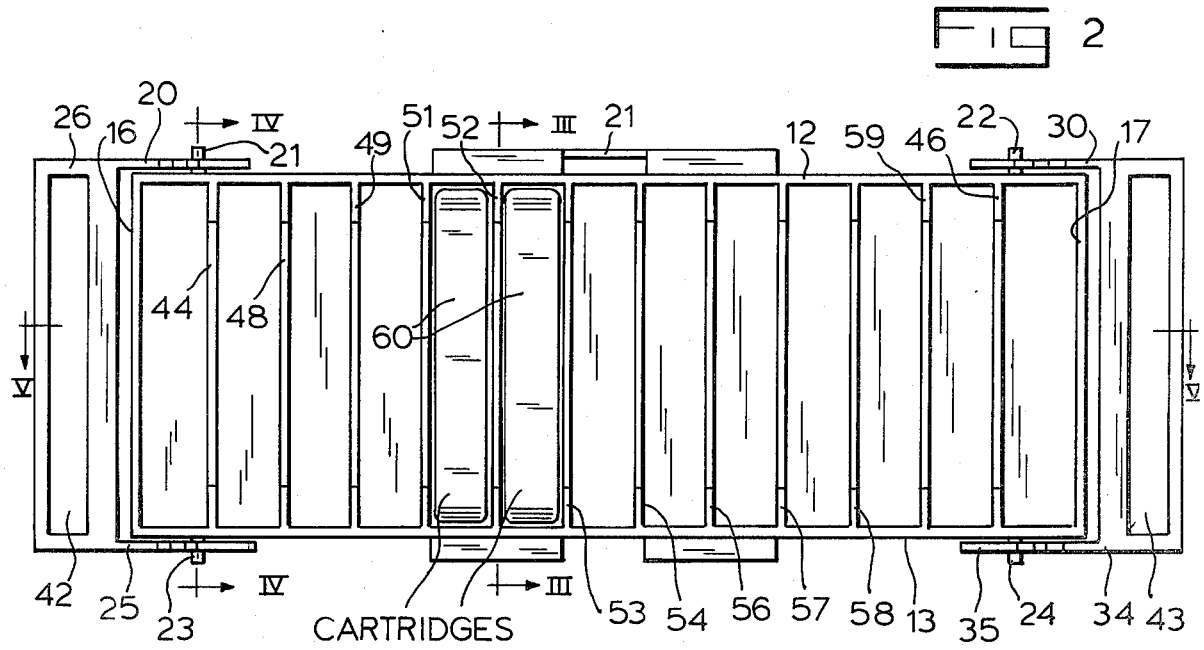

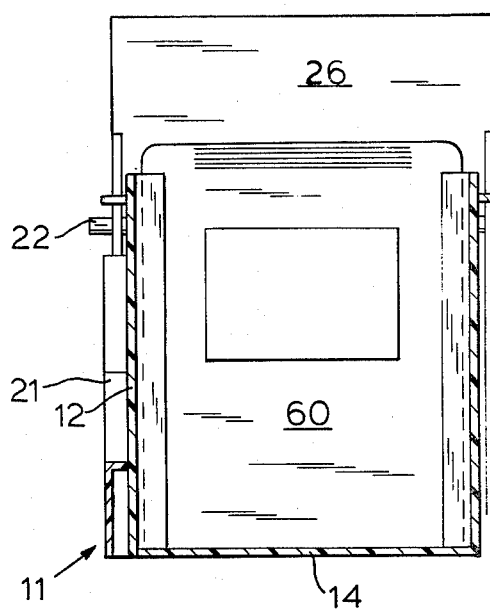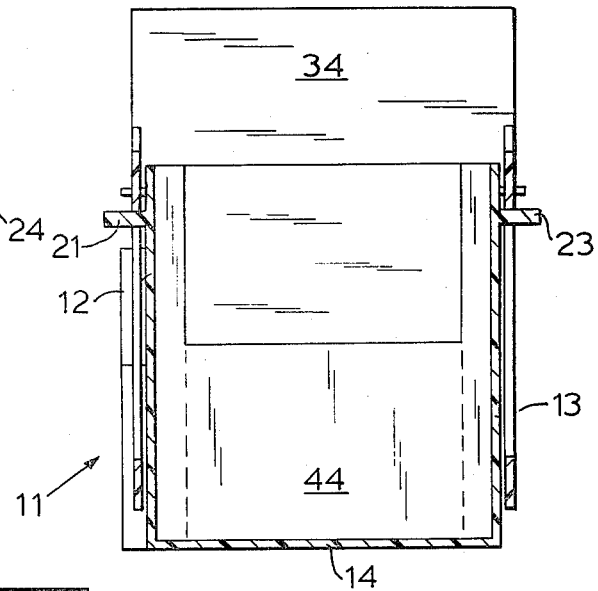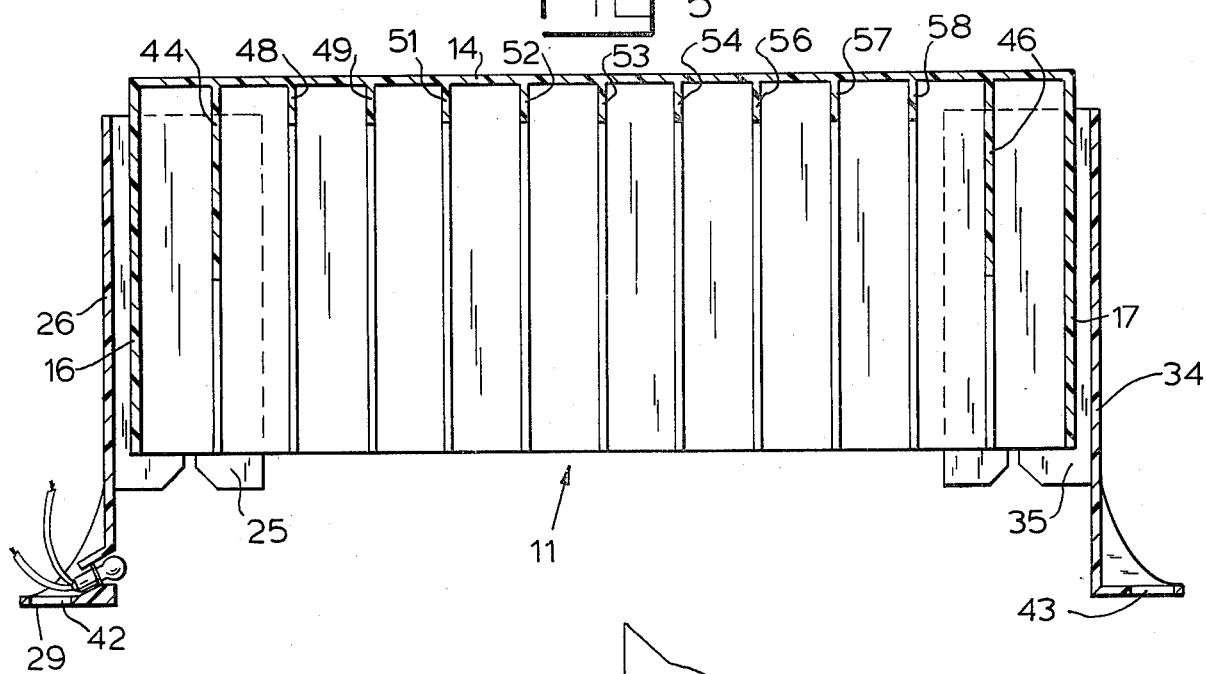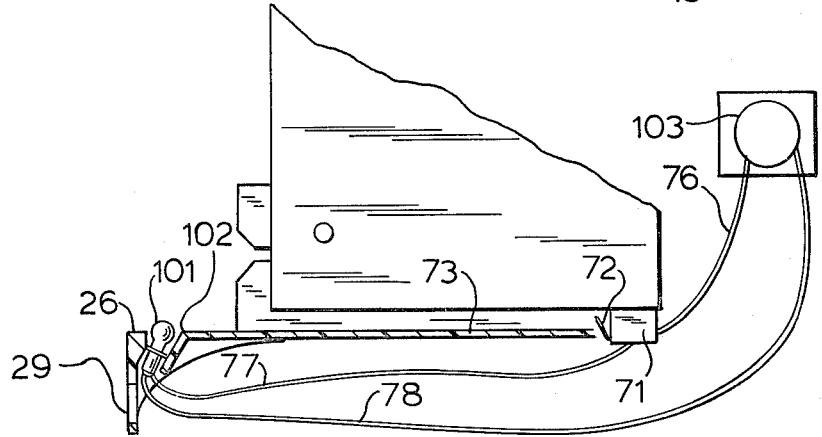

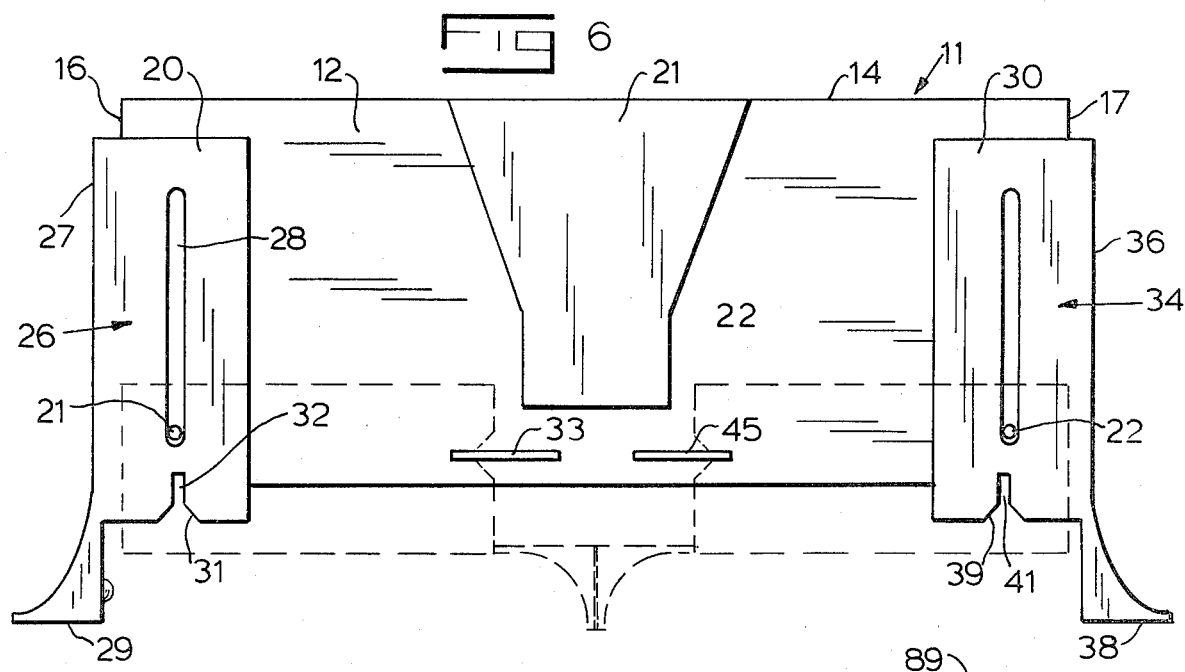
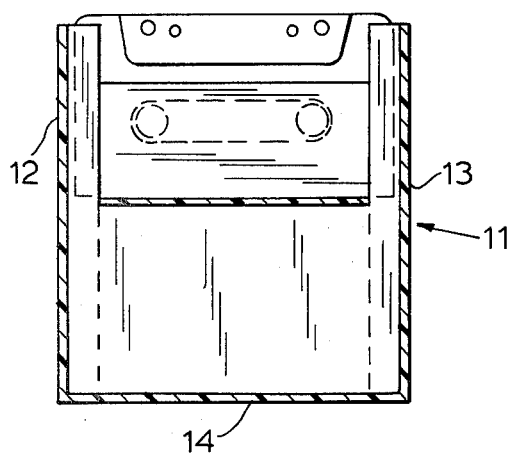
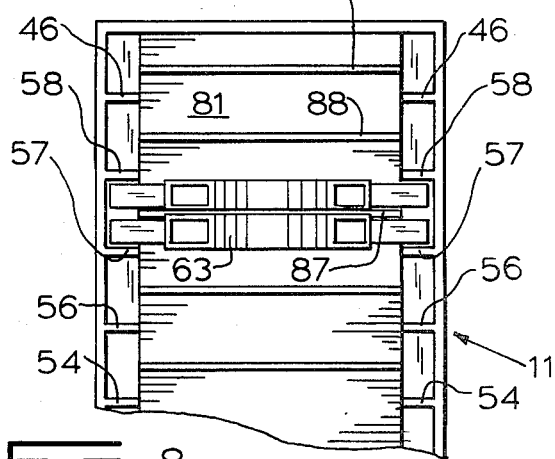
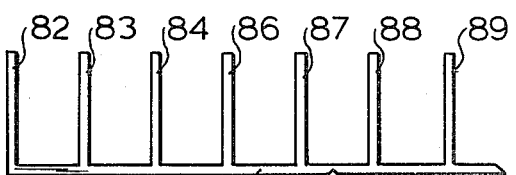
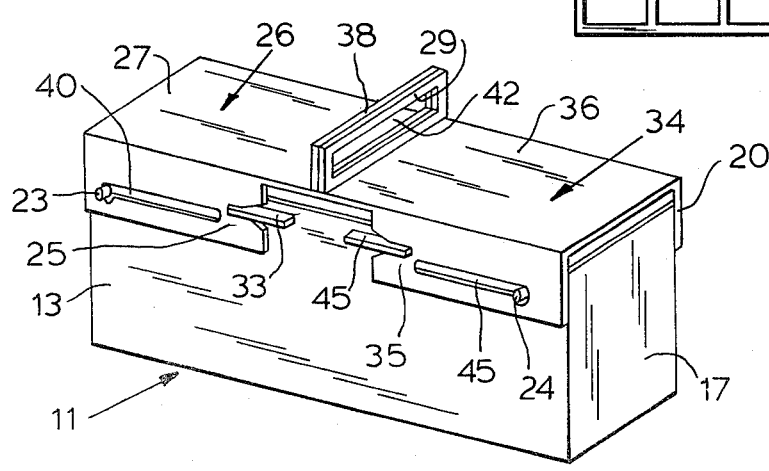

TAPE STORAGE CABINET

BACKGROUND OF THE INVENTION

1. Field of the Invention

This invention relates generally to a tape storage cabinet and particularly to a tape storage cabinet for cassettes and/or cartridges.

2. Description of the Prior Art

Automotive holders for tape have previously been designed to hold either cartridges or cassettes but not both and U.S. Pat. Nos. 3,371,976, 3,606,447, 3,627,398 and 3,443,851 illustrate such structures.

SUMMARY OF THE INVENTION

The present invention comprises a tape storage cabinet which can be detachably connected to a vehicle such as below the dash of a car and which has a pair of pivoting doors to cover the front and which can be moved to open the cabinet and provide access to the interior.

U-shaped dividing partitions in the cabinet provide storage for 8 track tape cartridges which are relatively large. A plate with partitions can also be inserted into the cabinet so as to provide storage for tape cassettes which are substantially smaller than tape cartridges. A light may be provided which is turned on when the covers are opened and the cover members are handles for carrying the cabinet when it is removed from the vehicle.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 illustrates the cabinet mounted beneath the dash of a car;

FIG. 2 is a top plan view of the invention with the covers open;

FIG. 3 is a sectional view taken on line III—III in FIG. 2;

FIG. 4 is a sectional view taken on line IV—IV in FIG. 2;

FIG. 5 is a sectional view taken on line V—V in FIG. 2;

FIG. 6 is a top elevational view;

FIG. 7 is a sectional view illustrating the plate for cassettes;

FIG. 8 is a partial top view illustrating the cabinet holding cassettes;

FIG. 9 illustrates the cassette plate;

FIG. 10 illustrates a perspective view of the cabinet when removed from a vehicle; and FIG. 11 is a detailed view illustrating the light bulb mechanism.

DESCRIPTION OF THE PREFERRED EMBODIMENTS

FIG. 1 illustrates a vehicle dash below which is detachably mounted the cabinet 11 of the invention.

The cabinet has a top wall 12, a bottom wall 13, end walls 16 and 17 and a back wall 14 illustrated in the various Figures. The cabinet has a pair of cover handle members 26 and 34 which are movable to a first position to close the cabinet and to a second position to open the cabinet so that the tapes are available.

The cover member 26 has side members 20 and 25 which are connected to the main cover member 27.

Two pins 21 and 23 are respectively attached to the top and bottom walls 12 and 13 and extend through slots 28 and 40 formed in side members 20 and 25.

The cover member 34 has side members 30 and 35 which are connected to main cover member 36.

Two pins 22 and 24 are respectively attached to the top and bottom walls 12 and 13 and extend through slots 37 and 45 formed through the side members 30 and 35.

Handle portions 29 and 38 extend outwardly when the covers 26 and 34 are closed and have openings 42 and 43 to provide handles.

Each of the side members 20, 25, 30 and 35 are formed with slots such as slots 32 and 41 illustrated in FIG. 6. The slots 32 and 41 have forward tapered portions 31 and 39.

Four locking extensions are attached to the top and bottom walls 12 and 13 to interlock with the slots 32 and 41 and the corresponding unnumbered slots of the side members 20, 25, 30 and 35. FIG. 6 illustrates in solid line the cover members 26 and 34 in the open position. This Figure also illustrates in dashed line the cover members 26 and 34 in the closed locked position with the members 33 and 45 in the slots 32 and 41. This position is also illustrated in FIG. 10.

Within the cabinet are mounted a plurality of U-shaped partitions 44, 46, 48, 49, 51, 52, 53, 54, 56, 57 and 58 as shown in FIG. 5 which illustrates 11 partitions. FIG. 2 illustrates 12 partitions but any desired number can be used. The distance between adjacent partitions is such that 8 track tape cartridges 60 fit between them as shown in FIGS. 2 and 3.

A plate 81 with a plurality of parallel extensions 82, 83, 84–89 is adapted to be inserted into the cabinet 11 until it rests upon the end U-shaped members 44 and 46 and snaps into a locked position due to an interference fit therewith. Members 44 and 46 extend beyond the other U-shaped partitions for this purpose.

As shown in FIGS. 7 and 8 when the plate 81 is in position, tape cassettes 62 and 63 can be inserted into the cabinet 11. The spacing between the U-shaped partitions such as 57 and 58 is such that when plate 81 is in position, its extensions such as 87 and 88 are located half way between partitions 57 and 58. This allows cassettes 62, 63 to be mounted (see FIG. 8). Thus, two times as many cassettes can be mounted in the cabinet as cartridges. Also, if both cassettes and cartridges are to be mounted in the cabinet 11, the plate 81 can be broken in two at a desired position and the selected piece can be inserted into the cabinet and locked.

As shown in FIG. 6, an attaching recepticle 21 with a smaller portion 22 is attached to the top wall 12 and is adapted to receive a suitable bracket to attach the cabinet to the vehicle.

FIG. 11 illustrates an optional light for illuminating the cabinet when the cover member is opened. The end 73 of the cover member 26 engages a switch contact 72 of a switch 71 to turn on a light bulb 101 mounted in an opening 102 of the cover member 26. Wires 76, 77 and 78 connect the switch 71, the bulb 101 and a plug 103 which can be inserted into the cigarette lighter socket of a vehicle.

FIG. 10 illustrates the invention when disconnected from the vehicle.

Although the invention has been described with respect to preferred embodiments, it is not to be so limited as changes and modifications can be made which are within the full intended scope of the invention as defined by the appended claims.

We claim as our invention:

1. A cabinet for tapes comprising a container having a top wall, a bottom wall, a back wall and first and second side walls, first and second front cover members each having a front panel and top and bottom panels attached thereto including a plurality of U-shaped partition members attached to said top, bottom and back walls and spaced apart a distance sufficient to receive tape cartridges therebetween, further including a plate with a plurality of parallel extensions attached thereto and capable of being detachably inserted into said cabinet and the spacing between said parallel extensions being about equal to the spacings between said partition members and such that tape cassettes are receivable therebetween.

2. A cabinet for tapes according to claim 1 including locking means to lock said first and second cover members in the closed position.

3. A cabinet for tapes according to claim 2 wherein said locking means comprises locking slots formed in said first and second panel members and locking projections formed on said top or bottom wall.

4. A cabinet according to claim 2 including handles attached to said first and second front panels.

5. A cabinet according to claim 1 wherein said parallel extensions are offset from said U-shaped partitions such that a cassette may be received between a parallel extension and a U-shaped partition.

6. A cabinet according to claim 5 wherein the plate with a plurality of extensions rests on the portion of said U-shaped partition members which is attached to the bottom wall of said cabinet.

7. A cabinet according to claim 6 wherein said plate with a plurality of parallel extensions is formed with weakened areas so that said plate can be separated into two parts and one part can be mounted in said cabinet such that both cassettes and cartridges can be simultaneously stored in said cabinet.

8. A cabinet according to claim 1 including a light mounted in said first front cover member and a switch mounted on said first side wall and engageable with said first cover member when opened to turn on said light.

* * * * *